United States Patent [19]

Sharp et al.

[11] Patent Number: 5,317,454
[45] Date of Patent: May 31, 1994

[54] BROADBAND SELF-ACTIVATED OPTICAL POWER LIMITER SYSTEM AND DEVICE

[75] Inventors: Edward J. Sharp, Fort Washington, Md.; Gary L. Wood, Lorton; Richard R. Shurtz, II, Oakton, both of Va.

[73] Assignee: The United States of America as represented by the Secretary of the Army, Washington, D.C.

[21] Appl. No.: 648,512

[22] Filed: Aug. 30, 1984

[51] Int. Cl.$^5$ .................. C02B 5/28; C02B 21/60
[52] U.S. Cl. .................. 359/886; 359/45; 359/66; 359/15; 359/890
[58] Field of Search ............... 332/7.51; 350/105, 168, 350/346, 347 R, 347 V, 348, 351, 314

[56] References Cited

U.S. PATENT DOCUMENTS

| | | | |
|---|---|---|---|
| 3,792,916 | 2/1974 | Sarna | 332/7.51 |
| 4,140,369 | 2/1979 | Howland | 350/168 |
| 4,477,151 | 10/1984 | Marb | 350/351 |

OTHER PUBLICATIONS

Bobb, L.; "Active Optical Filter"; May 30, 1979; pp. 1–10; N&IS AD-D006 403/0; Abst. Provided.
Ashkin et al.; "Continuous Wave ... Kerr Media"; Jun. 1982; pp. 276–278, Optics Letters; vol. 7, No. 6.
Smith et al., "Use of a Liquid Suspension of dielectric Spheres"... Aug. 1982, pp. 347–349; Optics Letters, vol. 7, #8.
Khoo, I. C.; "Optical Thermos Induced TIR ... ", Apr. 15, 1982, pp. 645–647; Appl. Phys. Lett., vol. 40, No. 8.

Primary Examiner—Nelson Moskowitz
Attorney, Agent, or Firm—Milton W. Lee; Anthony T. Lane; Aubrey J. Dunn

[57] ABSTRACT

(S) A first optical material with a linear index of refraction is distributed as particles in a second optical material with an index of refraction dependent on the incident radiation intensity. Below some threshold intensity level the combination of materials is transparent to incident radiation directed toward a sensitive optical detector. Above this level, high-intensity incident radiation induces a change in refractive index of the second material, and the combination is limiting to incident radiation.

8 Claims, 1 Drawing Sheet

BROADBAND SELF-ACTIVATED OPTICAL POWER LIMITER SYSTEM AND DEVICE

The invention described herein may be manufactured, used, and licensed by the U.S. Government for governmental purposes without the payment of any royalties thereon.

BACKGROUND OF THE INVENTION

This invention is in the field of optical counter-counter measure systems, and is particularly concerned with those systems which protect sensitive photodetector against counter measures such as high power lasers. These lasers can temporarily or permanently disable optical devices such as infrared detectors, television camera tubes, image intensifiers, and the human eye. Various counter-counter measures have been proposed for use against high-power laser threats, including various shutter devices, interference filters, etc. Unfortunately, most of these measures have one or more shortcomings, such as response time (which must be in the nanosecond range), bandwidth, power handling capability (which may be thousands of optical watts), healing time (after the threat ends), complexity, cost, etc. The instant invention is relatively cheap and easy to construct, has a very short response time, is self-activating and healing, can readily handle high powers, and is broadband. Of these characteristics, bandwidth is now becoming more important, since high-power and wavelength agile lasers are now available and/or are being developed in the optical spectrum from ultraviolet to mid-infrared (200–6000 nm).

SUMMARY OF THE INVENTION

The invention is a system for limiting optical power to a sensitive photodetector, and includes a device having a non-linear optical medium with particles of a linear optical material suspended therein. For normal low light radiation intensities, the medium and the material have the same index of refraction and are transparent to the light. When, however, high-intensity light is incident on the device, the index of refraction of the non-linear medium is shifted to a value differing from that of the particles. This change does two things, (1), it allows the suspended particles to act as scattering sites for the high intensity light, and (2) the induced change in index of refraction of the non-linear medium leads to self focusing. Self focusing will displace the focus of the beam and creates larger than normal diffraction divergence angles. The light remaining after scattering will thus be defocused at the sensitive photodetector.

DESCRIPTION OF PREFERRED EMBODIMENT

Figure 1:
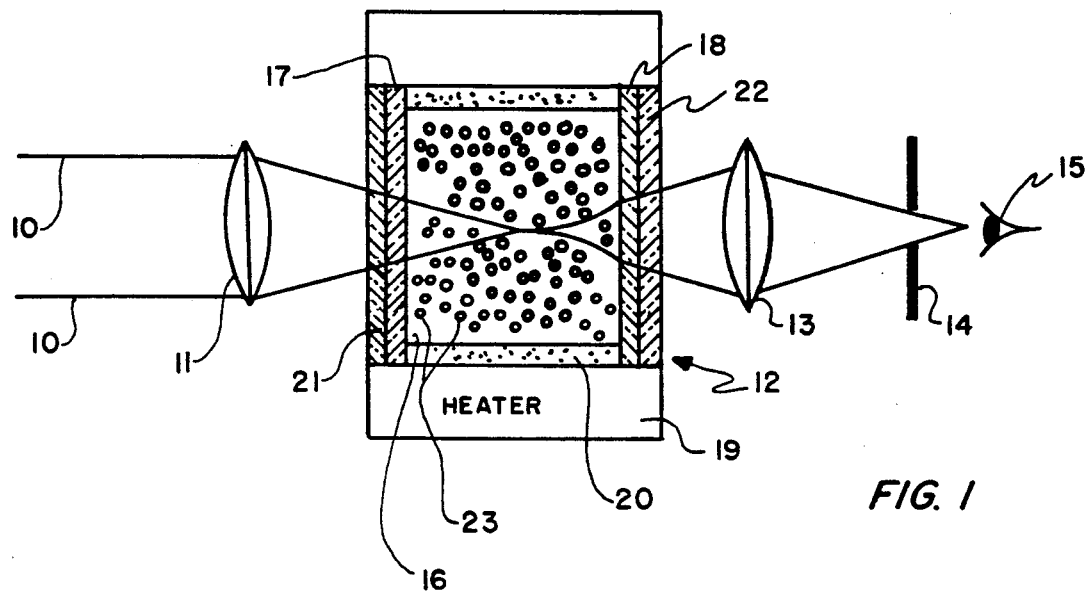
FIG. 1 is a schematic-sectional showing of the invention, for low or normal-intensity incident light.

The invention might be best understood if this description is taken in conjunction with the drawings. In the drawings, FIG. 1 shows the inventive system and device for normal incident radiation shown by rays 10. These rays are focussed by lens 11 into device 12. The rays pass through 12 and are focussed by lens 13 through aperture 14 to detector 15 (shown as a human eye).

The particular construction of device 12 is as follows: a nonlinear optical material 16 is enclosed in a cell with transparent end plates (windows) 17 and 18, and outer wall/heater 19. Inside of 19 is a radiation-absorbing layer 20, and on plates 17 and 18 are anti-reflection layers 21 and 22. Material 16 is a liquid crystal, in the isotropic state, whose index of refraction $n_{LC}$ is as follows: $n_{LC} = n_o + n_2 (E^2)$, wherein $n_o$ is the linear index and $n_2$ is the intensity-dependent index, and $(E^2)$ is the time-average square of the optical field. Suspended in 16 are fine particles 23 (exaggerated in size for the drawing) of a material whose linear index of refraction is equal to $n_{LC}$. The liquid crystal is chosen to have its nematic/isotropic phase transition temperature near but below the system operation temperature. The temperature of the cell 12 is maintained by heater 19. Not only does the heater maintain the isotropic phase of medium 16, but, because $n_{LC}$ is also a function of temperature we can selectively tune the linear index of the liquid crystal to exactly match the material of particles 23. Material 23 may be chosen from such transparent materials as glass, quartz, and various plastics and ceramics. Windows 17 and 18 may be made of the same material as 23, or other linear materials refractive-index matched to 23 and 16 at system operation temperature. These linear materials, which have a refractive index of about 1.5, allow easy match with material 16, since most liquid crystals also have an index of refraction of about 1.5. It should be understood that device 12 may be a volume of revolution, or other shape as desired.

Figure 2:
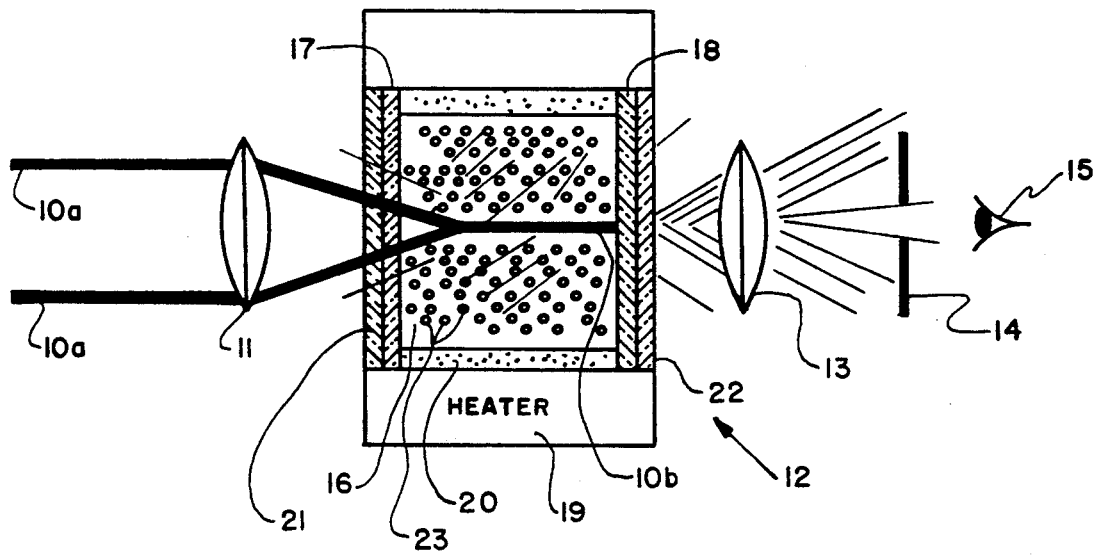
FIG. 2 is a schematic-sectional showing of the invention, for high-intensity incident light.

Referring now to FIG. 2, we may see the effect of high-intensity radiation 10B.

Again, the incoming radiation is focused into the cell 12 by lens 11. However, at the focal point, the electric field strength is large enough to cause the nonlinear term in the index of refraction of the liquid crystal to become significant. This causes an index mismatch with the suspended particles. If the particles are made such that their radius is less than or on the order of magnitude of the incoming radiation's wavelength, the scattering can be significant. The scattering will continue beyond the focus as long as the electric field strength is high enough to create an index mismatch. This scattered radiation will propagate out of the cell windows or be absorbed along the walls by 20.

Another phenomena for high intensity radiation occurs in the cell 12 that helps reduce the amount of radiation arriving at the sensitive photoconductor. Because of the index mismatch the electric field will either pull the particles 23 into the beam or away from the beam depending on whether $n_2$ is negative or positive. In either case the end result is an effective positive $n_2$ for the combined nonlinear medium and particles (known as an artificial Kerr medium see Smith P. W.; Maloney P. J.; Ashkin A.; Optics Letters, Vol. 7 No. 8, August 1982). This positive $n_2$ for the system determines a critical power. When radiation enters the cell above this critical power, $P_c$, a phenomena known as self focusing occurs. Self focusing means the radiation will not leave the focused spot as it entered instead the beam remains in a narrow filament, 10b, and propagates to the exit window this way. At the exit window the beam diverges. The focusing lens 13 will not be able to collect this exiting radiation as 13 was placed to collect radiation that focused in the cell 12. As a result, little of this self focused radiation will focus on the sensitive photodetector. Most of it will get absorbed by the surface of aperture 14 not making it through.

We claim:

1. A system for limiting optical power to a sensitive photodetector comprising:

an optical device including a medium transparent to optical radiation below a predetermined threshold level, limiting to radiation above said threshold level, and consisting of a first material having a linear index of refraction distributed as particles in a second material with an index of refraction at least partially related to optical radiation intensity, whereby said materials have the same index of refraction to radiation below said threshold level and the particle size of said first material is on the order of or less than the wavelength of said radiation;

means for directing optical radiation into said medium; and means for directing optical radiation which transmits through said medium toward said photodetector, whereby the index of refraction of said second material changes for radiation above said threshold level, whereby because of the resulting mismatch of indices of refraction of said materials, said particles act as scattering sites for said radiation.

2. An optical device including a medium transparent to optical radiation below a predetermined threshold level, and a limiting to radiation above said threshold level, and consisting of a first material having a linear index of refraction distributed as particles in a second material with an index of refraction at least partially related to optical radiation intensity, whereby said materials have the same index of refraction to radiation below said threshold level and the particle size of said first material is on the order of or less than the wavelength of said radiation, and whereby the index of refraction of said second material changes for radiation above said threshold level, whereby, because of the resulting mismatch of indices of refraction of said materials, said particles act as scattering sites for said radiation.

3. The system as set forth in claim 1 wherein said second material is a liquid crystal.

4. The optical device as set forth in claim 2 wherein second material is a liquid crystal.

5. An optical device including an enclosure with transparent end windows, a temperature-controlled outer wall, a radiation-absorbing material lining the inside of said wall, a transparent medium within said enclosure and with an index of refraction at least partially related to incident radiation intensity and consisting of a first material having a linear index of refraction at least partially related to optical radiation intensity, whereby said materials have the same index of refraction to radiation below said threshold level and the particle size of said first material is on the order of or less than the wavelength of radiation, and whereby the index of refraction of said second material changes for radiation above said threshold level, whereby, because of the resulting mismatch of indices of refraction of said materials, said particles act as scattering sites for said radiation.

6. The system as set forth in claim 1, wherein the said particles have physical dimensions approximately equal to or less than the wavelength of said optical radiation.

7. The system as set forth in claim 2, wherein the said particles have physical dimension approximately equal to or less than the wavelength of said optical radiation.

8. The system as set forth in claim 3, wherein the said particles have physical dimension approximately equal to or less than the wavelength of said optical radiation.

* * * * *